(12) United States Patent
Ko et al.

(10) Patent No.: US 7,697,530 B2
(45) Date of Patent: Apr. 13, 2010

(54) METHOD AND APPARATUS FOR MANAGING INFORMATION FOR UNIVERSAL PLUG AND PLAY DEVICE

(75) Inventors: Young-goo Ko, Anyang-si (KR);
Sang-sun Choi, Suwon-si (KR);
Jeong-ja Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 650 days.

(21) Appl. No.: 11/580,066

(22) Filed: Oct. 13, 2006

(65) Prior Publication Data

US 2007/0086463 A1 Apr. 19, 2007

(30) Foreign Application Priority Data

Oct. 14, 2005 (KR) .................. 10-2005-0096963

(51) Int. Cl.
*H04L 12/56* (2006.01)
(52) U.S. Cl. ................... 370/392; 709/231
(58) Field of Classification Search ............ 370/230, 370/328; 455/432; 709/217, 232, 208, 222, 709/245, 200
See application file for complete search history.

(56) References Cited

U.S. PATENT DOCUMENTS

| 6,591,306 | B1 * | 7/2003 | Redlich ................ 709/245 |
| 7,020,464 | B2 * | 3/2006 | Bahl et al. ............. 455/432.1 |
| 7,085,814 | B1 * | 8/2006 | Gandhi et al. ........... 709/208 |
| 7,243,142 | B2 * | 7/2007 | Poirot et al. ............ 709/220 |
| 7,529,354 | B2 * | 5/2009 | Kiss et al. ............. 379/93.01 |
| 2003/0177211 | A1 * | 9/2003 | Cyr et al. .............. 709/222 |
| 2004/0111494 | A1 | 6/2004 | Kostic et al. |
| 2004/0267876 | A1 * | 12/2004 | Kakivaya et al. ........ 709/200 |
| 2005/0021737 | A1 * | 1/2005 | Ellison et al. .......... 709/224 |
| 2005/0122934 | A1 * | 6/2005 | Fujita .................. 370/328 |
| 2005/0198344 | A1 * | 9/2005 | Fujita .................. 709/231 |
| 2005/0251549 | A1 * | 11/2005 | Hlasny ................. 709/203 |
| 2008/0034087 | A1 * | 2/2008 | Huetter ................. 709/224 |
| 2008/0209034 | A1 * | 8/2008 | Shin et al. ............. 709/224 |

FOREIGN PATENT DOCUMENTS

| EP | 1 058 422 A1 | 6/1999 |
| KR | 10-2005-0035038 A | 4/2005 |
| KR | 10-2005-0048970 A | 5/2005 |
| WO | WO 2004/030292 A1 | 4/2004 |
| WO | 2004073227 A1 | 8/2004 |

* cited by examiner

*Primary Examiner*—Thong H Vu
(74) *Attorney, Agent, or Firm*—Sughrue Mion, PLLC

(57) ABSTRACT

A method and apparatus for managing information regarding a Universal Plug and Play (UPnP) device when an Internet Protocol (IP) address of the UPnP device is changed are provided. In the method, a second address of the UPnP device is obtained from a message indicating the end of a first address-based network connection based on a first address of the device, and information regarding the UPnP device is updated by using the second address.

18 Claims, 7 Drawing Sheets

METHOD AND APPARATUS FOR MANAGING INFORMATION FOR UNIVERSAL PLUG AND PLAY DEVICE

CROSS-REFERENCE TO RELATED PATENT APPLICATIONS

This application claims the priority of Korean Patent Application No. 10-2005-96963, filed on Oct. 14, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to a Universal Plug and Play (UPnP) device, and more particularly, to a method and apparatus for managing information regarding a UPnP device when an Internet Protocol (IP) address of the UPnP device is changed.

2. Description of the Related Art

Since a personal computer (PC) can automatically recognize peripherals using a Plug and Play function, a user can easily install peripherals. UPnP is a technique of extending the Plug and Play function all over a network and allows devices (PCs, peripherals, home appliances, etc.) to automatically recognize each other when they are connected to the network.

Figure 1:
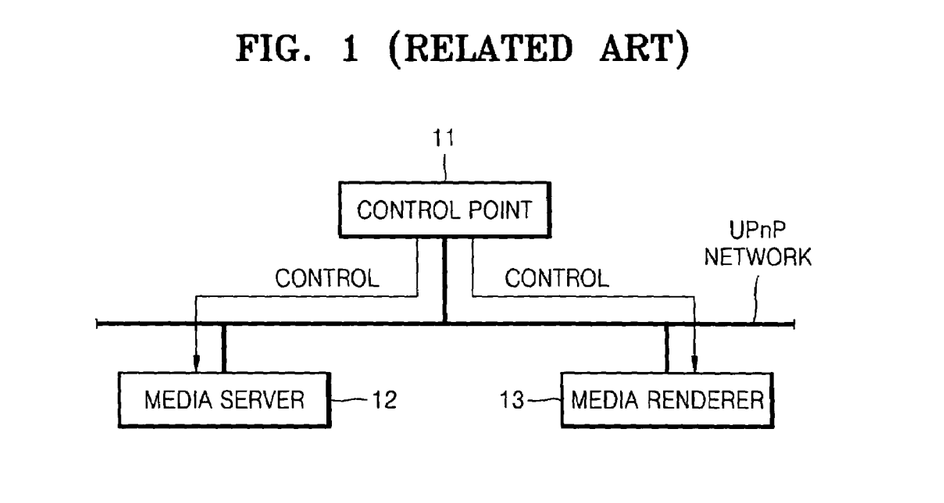
FIG. 1 is a block diagram of a related art Universal Plug and Play (UPnP) network.

FIG. 1 is a block diagram of a related art UPnP network system. Referring to FIG. 1, the related art UPnP network system includes a control point 11 and UPnP devices 12 and 13. In particular, the UPnP devices 12 and 13 may be a media server and a media renderer, respectively.

The control point 11 recognizes UPnP devices existing in a network and controls the recognized UPnP devices. The media server 12 provides UPnP content. The media renderer 13 renders the UPnP content provided by the media server 12 according to a UPnP standard. The media renderer 13 may be a digital TV reproducing media content.

Figure 2:
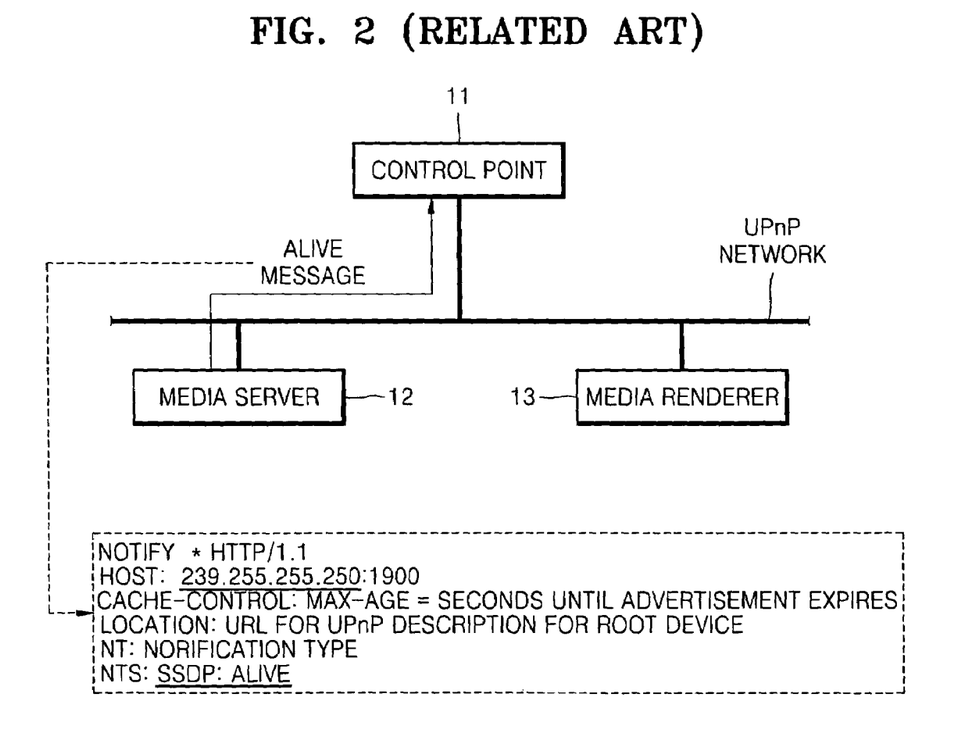
FIG. 2 is a block diagram for illustrating transmission of a UPnP alive message in the related art UPnP network of FIG. 1.

FIG. 2 is a block diagram for illustrating transmission of a UPnP alive message in a related art UPnP network. When a device is added to the UPnP network, the device transmits a UPnP alive message in a format, shown in FIG. 2, to the control point 11. In detail, FIG. 2 illustrates a case where the media server 12 is added to the UPnP network.

Figure 3:
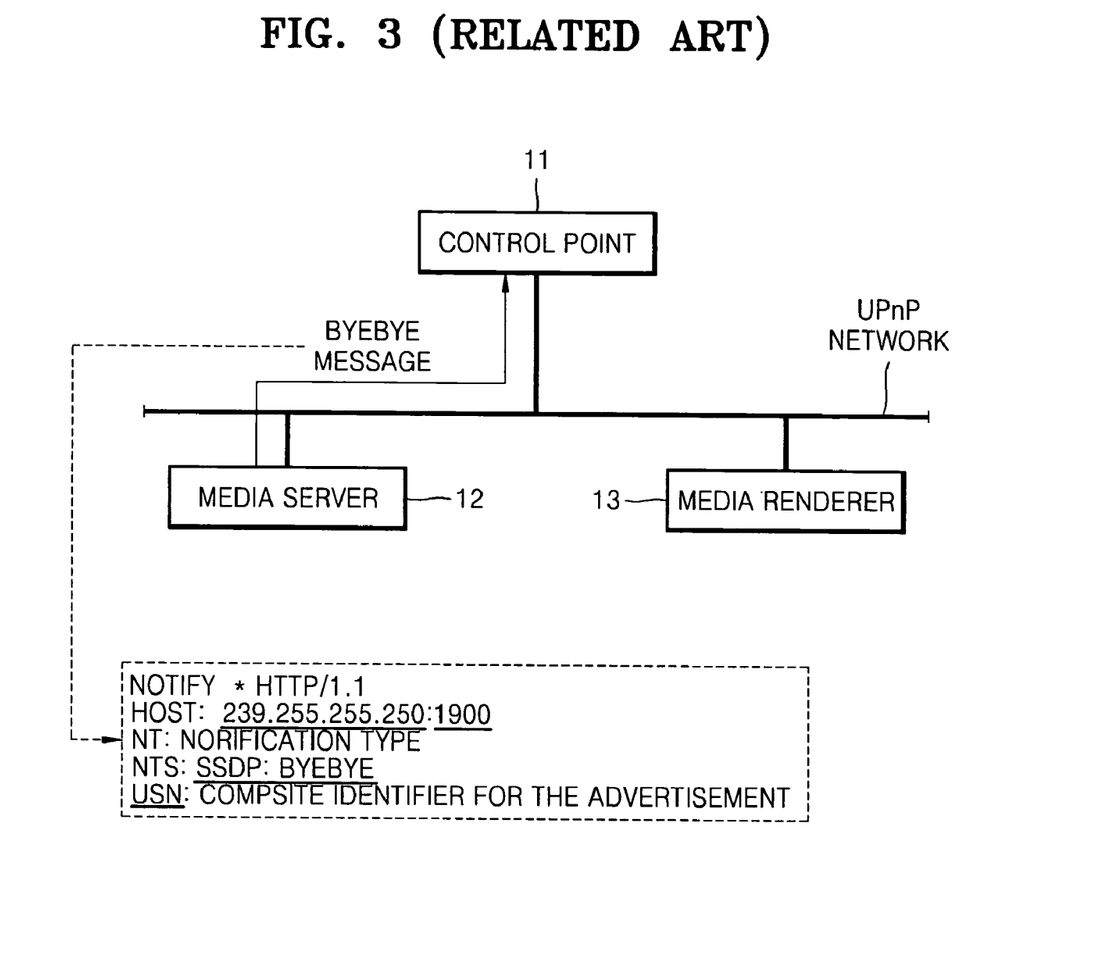
FIG. 3 is a block diagram for illustrating transmission of a UPnP byebye message in the related art UPnP network of FIG. 1.

FIG. 3 is a block diagram for illustrating transmission of a UPnP byebye message in a related art UPnP network system. When a device is removed from a UPnP network, the device transmits a UPnP byebye message in a format, shown in FIG. 3, to the control point 11. In detail, FIG. 3 illustrates a case where the media server 12 is removed from the UPnP network.

Meanwhile, since the UPnP network is based on a TCP/IP (Transmission Control Protocol/Internet Protocol), a UPnP device must have its own IP address. Thus, for the IP address, the UPnP device includes a DHCP (Dynamic Host Configuration Protocol) client module and an automatic IP module. When a DHCP server is not detected in a network in which the UPnP device is located, the automatic IP module generates an IP address and sets it as an IP address of the UPnP device. When a DHCP server is detected in the network in which the UPnP device is located, the DHCP client module requests the DHCP server to provide an IP address, obtains the IP address as per the request, and sets it as the IP address of the UPnP device.

However, sometimes an IP address of a UPnP device is changed while the UPnP device is connected to a UPnP network based on the IP address. For instance, when a lease period of an IP address of a UPnP device, which is prescribed by a DHCP server, expires, the DHCP server allocates another IP address to the UPnP device; or when the DHCP server does not normally operate, the automatic IP module generates another IP address.

When the IP address of the UPnP device is changed, a network connection based on the previous IP address is disconnected, and a network connection is established based on the new IP address. Therefore, the UPnP device transmits the byebye message illustrated in FIG. 3 to the control point 11 and then transmits an alive message, shown in FIG. 2, to the control point 11.

The change in the IP address of the UPnP device changes a uniform resource locator (URL) via which a control request, for example, a message requesting a Simple Object Access Protocol (SOAP), is transmitted to the UPnP device; and a URL via which a request for an event, for example, a message requesting a General Event Notification Architecture (GENA), is transmitted to the UPnP device. Also, information regarding the UPnP device based on the previous IP address, e.g., a state variable, is removed from the control point 11, and new information regarding the UPnP device is generated based on the new IP address.

In addition, if the IP address of the UPnP device is changed, all of the sessions based on the previous IP address are discontinued, thereby stopping a service irrespective of a user's wishes. Thus, the user must restart the stopped service. If the IP address of the media server 12 or the media renderer 13 is changed, the content streaming session based on the previous IP address is discontinued, and reproduction of content using the media renderer 13 is suddenly stopped. In this case, the user must detect a point where content streaming is discontinued and restart content streaming at the detected point based on a new IP address.

SUMMARY OF THE INVENTION

An aspect of the present invention provides an apparatus and method for minimizing a period of time that a session is discontinued due to a change in a current IP address of a Universal Plug and Play (UPnP) device, and effectively managing information regarding the UPnP device without removing the information even if the IP address of the UPnP device is changed.

Another aspect of the present invention also provides a computer readable medium in which a program for executing the above method in a computer is stored.

According to an aspect of the present invention, there is provided a method of managing information regarding a device, the method comprising obtaining a second address of the device by using a message indicating an end of a first address-based network connection based on a first address of the device, and updating the information regarding the device using the obtained second address.

According to another aspect of the present invention, there is provided an apparatus for managing information regarding a device, the apparatus comprising a second address obtaining unit obtaining a second address of the device from a message indicating an end of a network connection based on a first address of the device, and an update unit updating the information regarding the device by using the second address obtained by the second address obtaining unit.

According to another aspect of the present invention, there is provided a computer readable medium having embodied thereon a program for the method of managing information regarding a device.

According to another aspect of the present invention, there is provided a method of providing an address of a device, the method comprising determining whether the address of the device is changed from a first address to a second address, and selectively providing the second address according to the determination result by using a message indicating an end of a first address-based network connection.

According to another aspect of the present invention, there is provided an apparatus for providing an address of a device, the apparatus comprising a detector determining whether the address of the device is changed from a first address to a second address, and a providing unit selectively providing the second address according to the determination result by using a message indicating an end of a first address-based network connection.

According to another aspect of the present invention, there is provided a computer readable medium having embodied thereon a program for the method of providing an address of a device.

According to another aspect of the present invention, there is provided a computer readable medium having embodied thereon a data construction of a byebye message containing information regarding an address change of a device compared to a Universal Plug and Play (UPnP) byebye message, the data construction comprising fields of the UPnP byebye message, a motive field indicating that transmission of the byebye message is motivated by the address change of the device, and a field recording a new Internet Protocol (IP) address of the device.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 4:
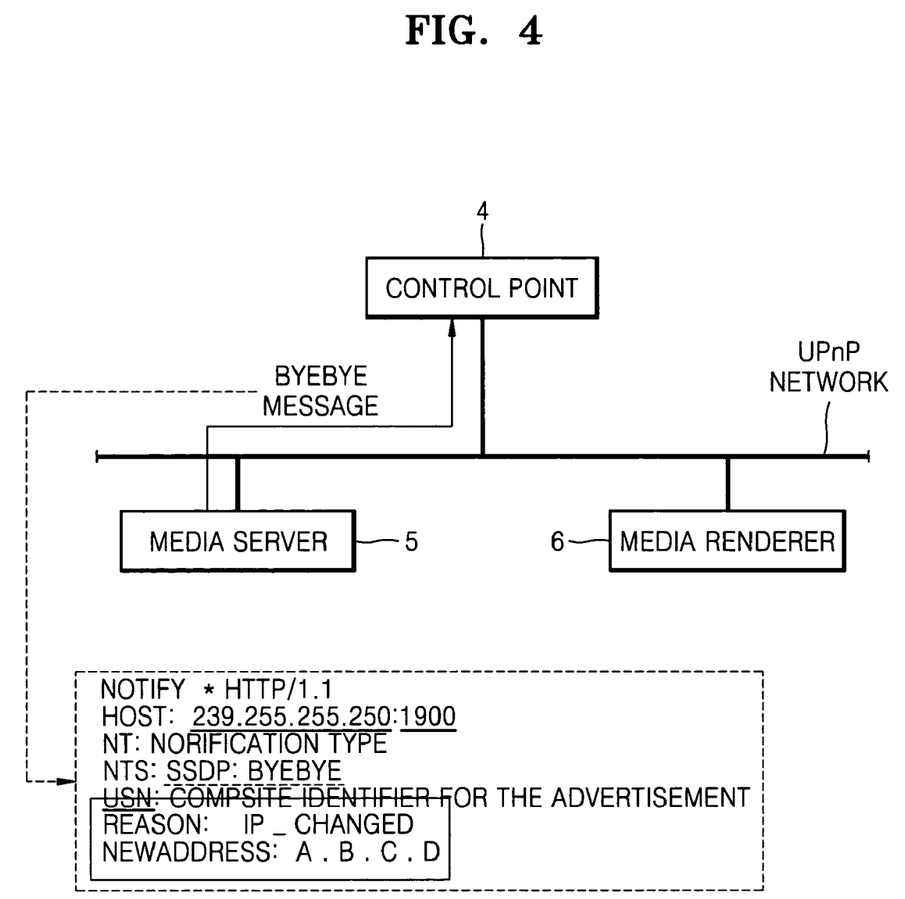
FIG. 4 is a block diagram for illustrating transmission of a byebye message according to an exemplary embodiment of the present invention.

FIG. 4 is a block diagram for illustrating transmission of a byebye message according to an exemplary embodiment of the present invention. When the Internet Protocol (IP) address of a device that is currently operating according to a Universal Plug and Play (UPnP) standard is changed, the device transmits a byebye message in a format, illustrated in FIG. 4, to a control point 4. Specifically, FIG. 4 illustrates a case where the IP address of a media server 5 is changed.

In the current embodiment of the present invention, as illustrated in FIG. 4, the byebye message further contains information regarding a change in the IP address of the media server 5, compared to the UPnP byebye message. Thus, the byebye message includes existing fields, a motive field indicating that transmission of the byebye message is motivated by the change in the IP address of the media server 5, and a field recording a new IP address of the media server 5.

In related art, if the IP address of a UPnP device is changed, a byebye message regarding the previous IP address is transmitted, and a new IP address is provided to the UPnP device when transmitting an alive message regarding the new IP address. However, in the current embodiment of the present invention, a new IP address of a UPnP device is provided using the byebye message, thereby minimizing a period of time that a session is discontinued due to the change in the IP address.

Figure 5:
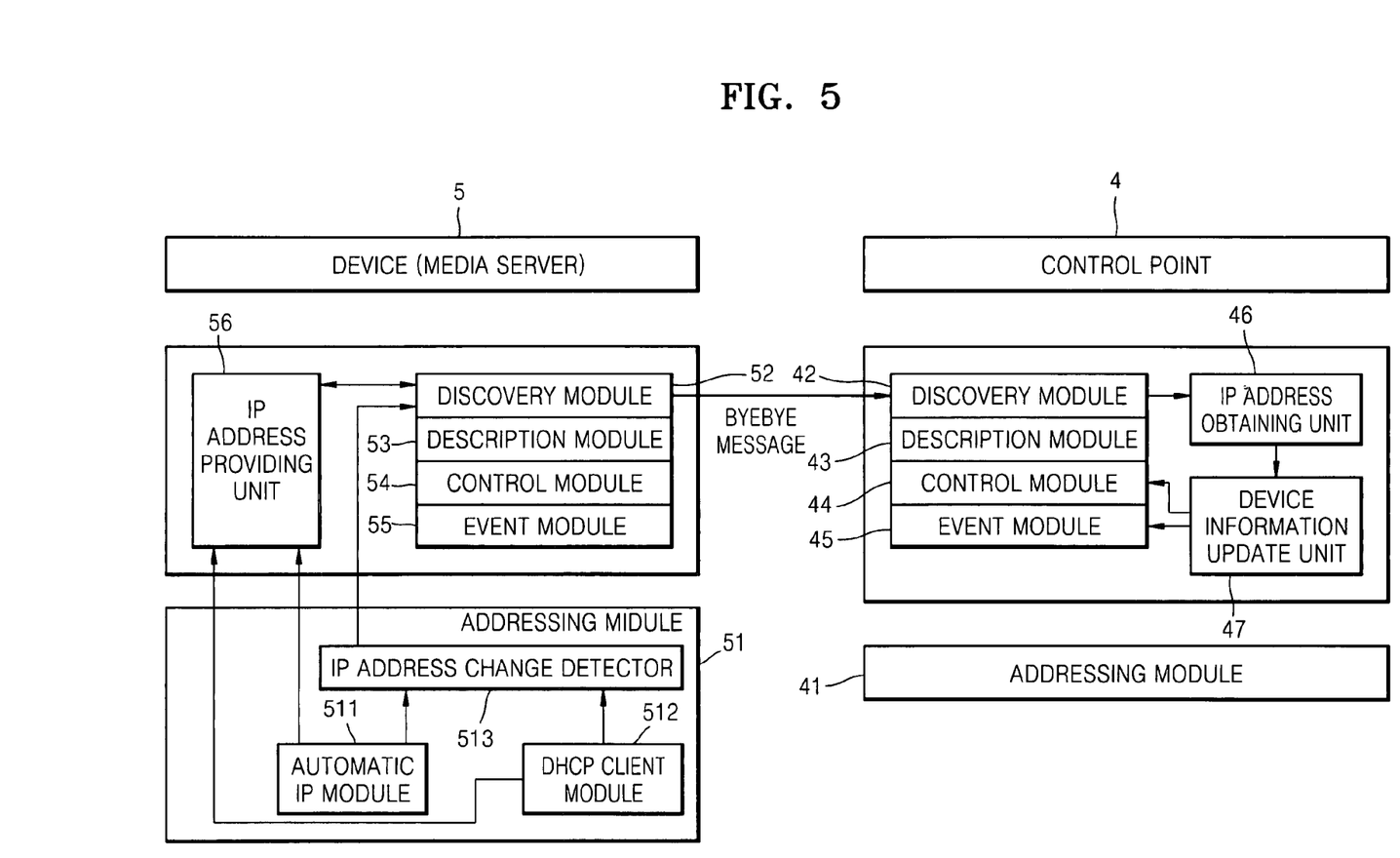
FIG. 5 is a block diagram of a device and a control point according to an exemplary embodiment of the present invention.

FIG. 5 is a block diagram of a device 5 and a control point 4 according to an exemplary embodiment of the present invention. Referring to FIG. 5, the device 5 includes an addressing module 51, a discovery module 52, a description module 53, a control module 54, an event module 55, and an IP address providing unit 56.

The addressing module 51 performs UPnP addressing. That is, the addressing module 51 designates an IP address of the device 5. In particular, in the current embodiment of the present invention, the addressing module 51 determines whether the IP address of the device 5 has been changed.

Referring to FIG. 5, the addressing module 51 includes an automatic IP module 511, a Dynamic Host Configuration Protocol (DHCP) client module 512, and an IP address change detector 513.

The automatic IP module 511 generates an IP address and sets it as the IP address of the device in cases where a DHCP server is not detected in a network to which the device 5 is located. Here, not detecting a DHCP server may indicate that there is no DHCP server present in the network in which the device 5 is located, or that even if a DHCP server is present in the network, the DHCP server does not normally operate.

When a DHCP server is detected in the network in which the device 5 is present, the DHCP client module 512 requests the DHCP server to provide an IP address, acquires the IP address as per the request, and sets it as the IP address of the device 5.

The IP address change detector 513 periodically checks the IP address of the device 5 set by the automatic IP module 511 or the DHCP client module 512 in order to determine whether the IP address of the device 5 has changed from a first IP address to a second IP address. In general, the IP address is changed when the DHCP server allocates another IP address to the UPnP device when a lease period of a previous IP address prescribed by a DHCP server expires or the automatic IP module 511 generates another IP address because the DHCP server does not normally operate.

The discovery module 52 performs UPnP discovery. Specifically, the discovery module 52 transmits an advertise message indicating that the device 5 is connected to the network, to the control point 4, according to a Simple Service Discovery Protocol (SSDP). Also, the discovery module 52 generates an alive message indicating the start of a network connection based on the IP address of the device 5 according to the SSDP, and transmits it to the control point 4. Also, the discovery module 52 transmits a byebye message indicating the end of the network connection based on the IP address of the device 5 according to the SSDP to the control point 4. In particular, in the current embodiment of the present invention, the discovery module 52 transmits a byebye message, which further contains information regarding a change in the IP address of the device 5 compared to the related art UPnP byebye message, to the control point 4 when the IP address change detector 513 determines that the IP address of the device 5 has been changed.

The description module 53 performs a UPnP description operation. Specifically, the description module 53 provides a description regarding the device 5 to the control point 4 which discovers the device 5 through UPnP discovery performed by the discovery module 52.

The control module 54 performs a UPnP control operation. That is, the control module 54 performs an operation corresponding to the control of the control point 4 which obtains the description regarding the device 5 through the UPnP description operation performed by the description module 53.

The event module 55 performs a UPnP event operation. That is, the event module 55 transmits an event message containing information regarding an event of the device 5 to the control point 4 which controls the device 5 according to the UPnP operation performed by the control module 54.

The IP address providing unit 56 selectively provides a second IP address of the device 5 to the control point 4 according to the checking result received from the IP address change detector 513, using a byebye message indicating the end of a first IP address-based network connection. More specifically, when the IP address change detector 513 determines that the IP address of the device 5 has been changed, the IP address providing unit 56 adds a field recording the second IP address, which is received from the automatic IP module 511 or the DHCP client module 513, to the byebye message generated by the discovery module 52, and transmits the byebye message to the control point 4.

Also, the IP address providing unit 56 instructs the information regarding the device 5 not to be deleted from the control point 4 by adding a motive field to the byebye message generated by the discovery module 52, the motive field indicating that transmission of the byebye message is motivated by a change in the IP address of the device 5. According to a related art UPnP standard, when a network connection between the device 5 and the control point 4 is disconnected by a change in the IP address of the device 5, the control point 4 removes information regarding the device 5 stored therein. To prevent this problem, in the current embodiment of the present invention, the motive field indicating that transmission of the byebye message is motivated by a change in the IP address of the device 5 is added to the byebye message.

Referring to FIG. 5, the control point 4 includes an addressing module 41, a discovery module 42, a description module 43, a control module 44, an event module 45, an IP address obtaining unit 46, and a device information update unit 47.

The addressing module 41 performs UPnP addressing. That is, the addressing module 41 designates an IP address of the control point 4. In particular, it would be apparent to those of ordinary skill in the technical field to which the present invention pertains that the current embodiment of the present invention can be applied not only when the IP address of the device 5 has been changed, but also when the IP address of the control point 4 has been changed.

The discovery module 42 performs UPnP discovery. Specifically, the discovery module 42 recognizes from the advertise message received from the device 5 that the device 5 is connected to the network. Also, the discovery module 42 receives from the device 5 the alive message indicating the start of a network connection based on the IP address of the device 5 according to the SSDP, and the byebye message indicating the end of the network connection based on the IP address of the device 5 according to the SSDP. In particular, in the current embodiment of the present invention, the discovery module 42 receives the byebye message that further contains information regarding a change in the IP address of the device 5 compared to the related art UPnP byebye message.

The description module 43 performs a UPnP description operation. Specifically, the description module 43 obtains a description of the device 5 from the device 5 recognized through UPnP discovery performed by the discovery module 52.

The control module 44 performs UPnP control. Specifically, the control module 44 controls the device 5 based on the description of the device 5 which is obtained through the UPnP description operation performed by the description module 43. In particular, in the current embodiment of the present invention, the control module 44 controls the device 5 through a second IP address-based network connection, based on information regarding the device 5 updated by the device information update unit 47. More specifically, the control module 44 controls the device 5 by using a uniform resource locator (URL) via which a request for control of the device 5 modified by the device information update unit 47, for example, a message requesting a Simple Object Access Protocol (SOAP) modified by the device information update unit 47, is transmitted.

The event module 45 performs a UPnP event operation. Specifically, the event module 45 receives an event message containing information regarding an event of the device 5 from the device controlled by UPnP control performed by the control module 44. In particular, in the current embodiment of the present invention, the event module 45 receives the event message through a second IP address-based network connection, based on the information regarding the device 5 updated by the device information update unit 47. That is, the event module 45 receives the event message using a URL via which a request for an event modified by the device information update unit 47, for example, a General Event Notification Architecture (GENA) modified by the device information update unit 47, is transmitted to the device 5.

The IP address obtaining unit 46 obtains the second IP address of the device 5 from the byebye message received by the discovery module 42. Specifically, the IP address obtaining unit 46 obtains the second IP address from an IP address field of fields recording IP address change details of the device 5, which are included in the byebye message.

The device information update unit 47 updates the information regarding the device 5 based on the byebye message received by the discovery module 42. In detail, when recognizing that transmission of the byebye message is motivated by a change in the IP address of the device 5 from a motive field of the fields recording the IP address change details of the device 5, the device information update unit 47 updates the information regarding the device 5 by using the second IP address obtained by the IP address obtaining unit 46 without removing the information regarding the device 5.

Figure 6:
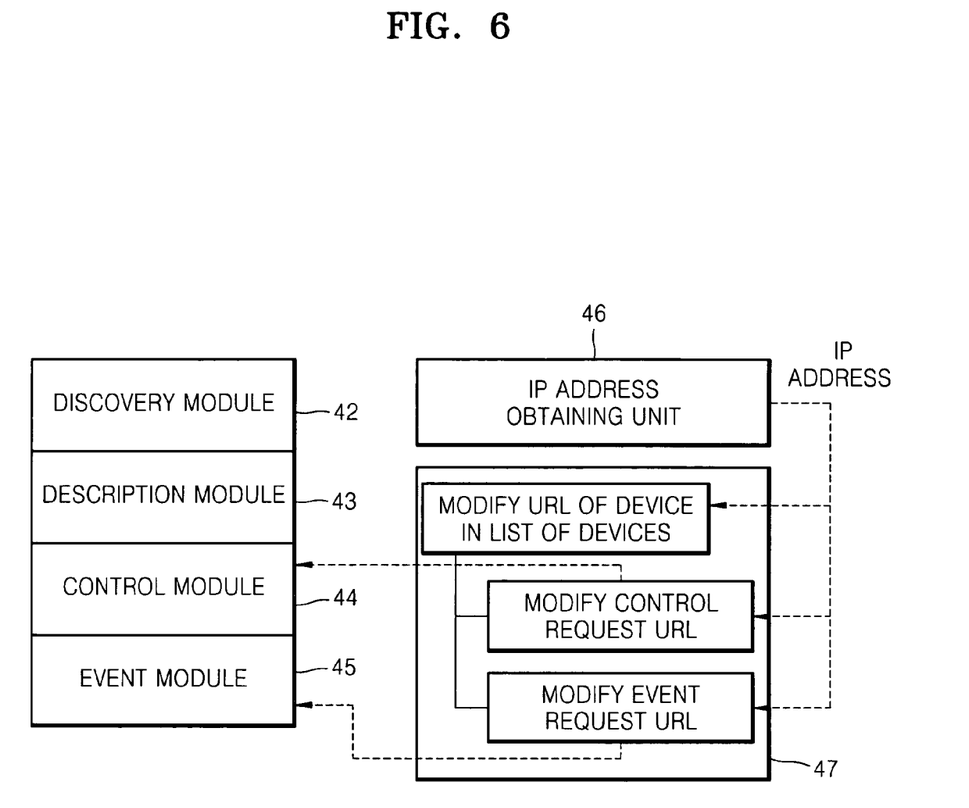
FIG. 6 is a diagram for illustrating an update operation performed by a device information update unit of FIG. 5 according to an exemplary embodiment of the present invention.

FIG. 6 is a diagram for illustrating an update operation performed by the device information update unit 47 of FIG. 5 according to an exemplary embodiment of the present invention. Referring to FIG. 6, the device information update unit 47 updates information regarding the device 5 by modifying a URL of the device 5 listed in a list of devices of the control point 4, based on an IP address, i.e. the second IP address of the device 5, which is obtained by the IP address obtaining unit 46, and allowing the control point 4 to modify a URL via which a control request, for example, a message requesting a SOAP, is transmitted to the device 5, and a URL via which an event request, for example, a message requesting a GENA, is transmitted to the device 5.

Therefore, unlike the prior art, when the IP address of the device 5 is changed, the control point 4 need not request a description of the device 5 again in order to learn the URL via which the message requesting the SOAP is received and the URL via which the message requesting the GENA is received.

Figure 7:
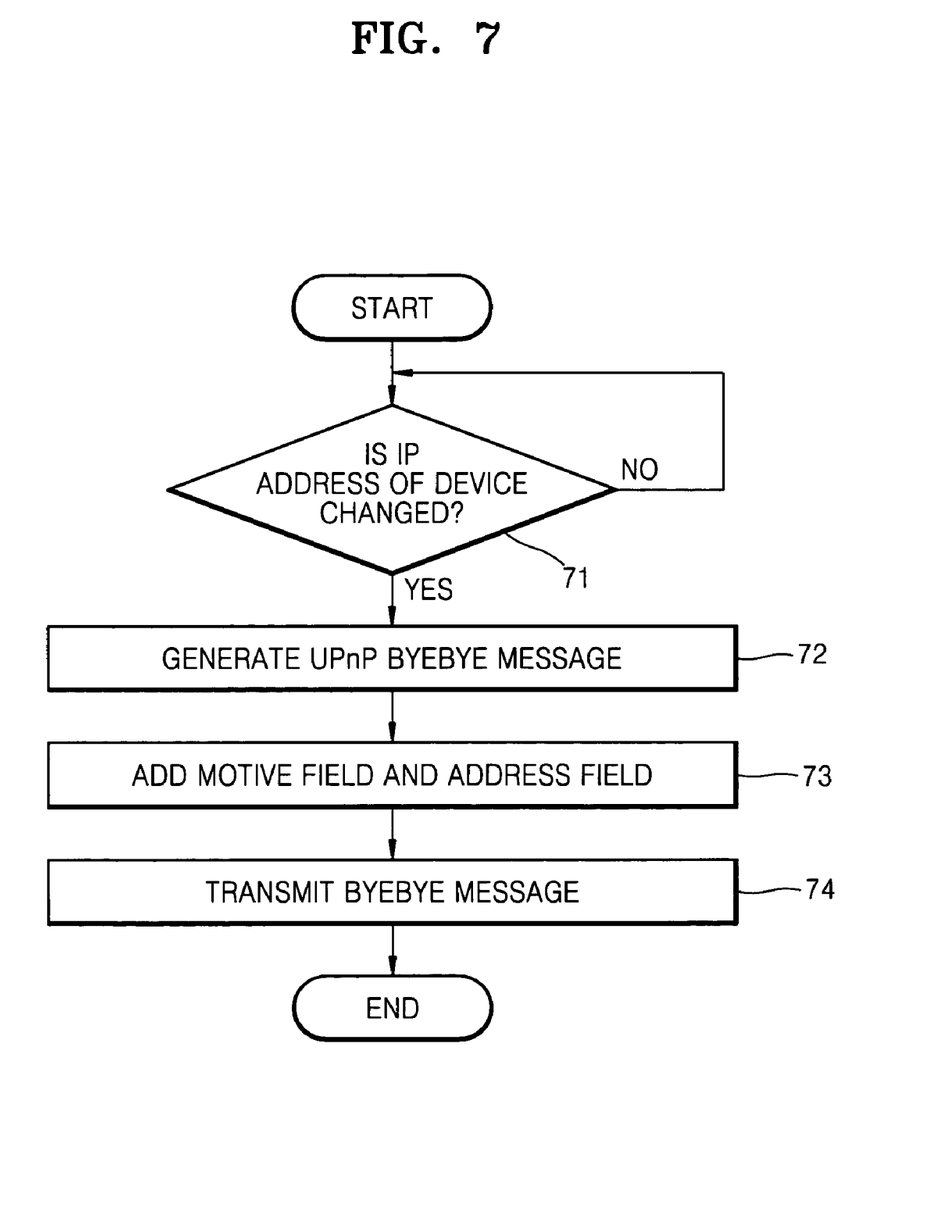
FIG. 7 is a flowchart illustrating a method of providing a device an IP address according to an exemplary embodiment of the present invention.

FIG. 7 is a flowchart illustrating a method of providing a device IP address according to an exemplary embodiment of the present invention. The method of FIG. 7 includes operations performed in the device 5 of FIG. 5 according to time sequence. Thus, although not described here, the operation of the device 5 is also applied to the method of FIG. 7.

Referring to FIG. 7, in operation 71, the device 5 periodically checks the IP address thereof to determine whether the IP address of the device 5 has been changed.

In operation 72, when it is determined in operation 71 that the IP address of the device 5 has been changed, the device 5 generates a UPnP byebye message indicating the end of a network connection based on the IP address of the device 5 according to the SSDP.

In operation 73, the device 5 provides a new IP address to the control point 4 by adding an address field recording the new IP address into the UPnP byebye message generated in operation 72, and instructs information regarding the device 5 not to be removed from the control point 4 by adding a motive field indicating that transmission of the UPnP byebye message is motivated by a change in the IP address of the device 5 to the UPnP byebye message.

In operation 74, the device 5 transmits to the control point 4 a byebye message that further contains information regarding a change in the IP address of the device 5 compared to the related art UPnP byebye message by adding the address field and the motive field to the UPnP byebye message in operation 73.

Figure 8:
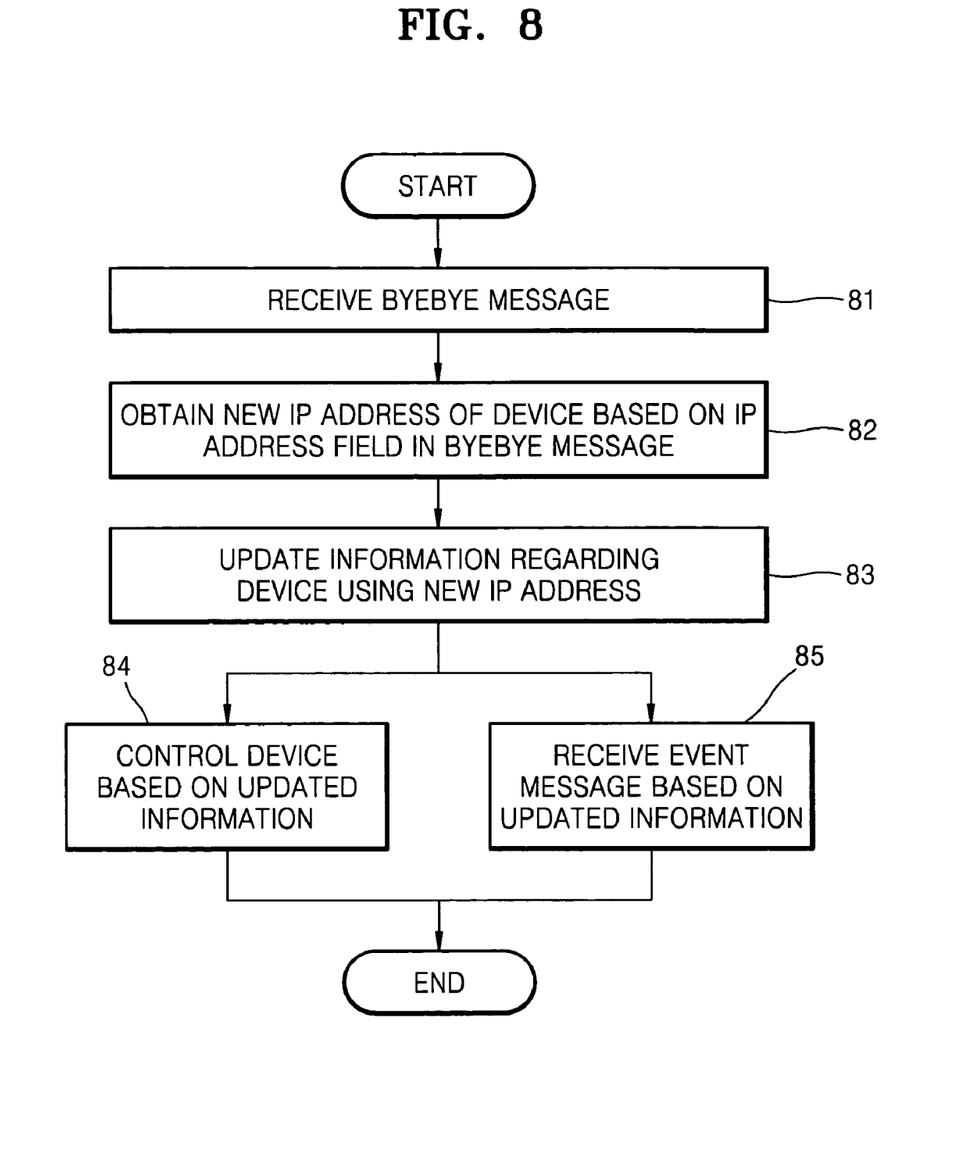
FIG. 8 is a flowchart illustrating a method of managing a device IP address according to an exemplary embodiment of the present invention.

FIG. 8 is a flowchart illustrating a method of managing a device IP address according to an exemplary embodiment of the present invention. The method of FIG. 8 includes operations performed in the control point 4 of FIG. 5 according to time sequence. Thus, although not described here, the operation of the control point 4 is also applied to the method of FIG. 8.

Referring to FIG. 8, in operation 81, the control point 4 receives from the device 5 a byebye message indicating the end of a network connection based on the IP address of the device 5, according to the SSDP. In particular, in operation 81, the control point 4 receives a byebye message that further contains information regarding a change in the IP address of the device 5, compared to a UPnP byebye message.

In operation 82, the control point 4 obtains a new IP address of the device 5 from the byebye message received in operation 81. More specifically, in operation 82, the control point 4 obtains the new IP address of the device 5 from an IP address field of fields that record IP address change details regarding the device 5 and that are included in the byebye message.

In operation 83, the control point 4 updates information regarding the device 5 using the byebye message received in operation 81. More specifically, in operation 83, when recognizing from a motive field of the fields recording IP address change details that transmission of the byebye message is motivated by a change in the IP address of the device 5, the control point 4 updates the information regarding the device 5 by using the new IP address obtained in operation 82 without removing the information regarding the device 5. That is, in operation 83, the control point 4 updates the information regarding the device 5 by modifying URLs of the device listed in a list of devices of the control point 4 according to the IP address, i.e., the new IP address, which is obtained in operation 82, and allowing the control point 4 to modify a URL via which a control request is transmitted to the device 5 and a URL via which an event request is transmitted to the device 5.

In operation 84, the control point 4 controls the device 5 through a network connection based on the new IP address of the device 5, based on the information regarding the device 5 updated in operation 83. In detail, in operation 84, the control point 4 controls the device 5 using a URL via which a control request is transmitted to the device 5, and which is updated in operation 83.

In operation 85, the control point 4 receives an event message containing an event of the device 5 through a network connection based on the new IP address of the device 5, based on the information regarding the device 5 updated in operation 83. In detail, in operation 85, the control point 4 receives the event message using a URL, via which an event request is transmitted to the device 5, and which is updated by the device information update unit 47.

The above embodiments of the present invention may be embodied as computer readable programs and performed in a general digital computer by executing the programs, using a computer readable medium. Also, the data constructions used in the above embodiments may be recorded on a computer readable medium via various devices.

Examples of the computer readable medium include a magnetic recording medium (a ROM, a floppy disk, a hard disc, etc.); and an optical recording medium (a CD-ROM, a DVD, etc.).

According to the present invention, it is possible to minimize a period of time that a session is discontinued due to an IP address change by providing a new IP address of a UPnP device using a byebye message when the IP address of the UPnP device is changed. In particular, according to an aspect of the present invention, when the IP address of the UPnP device is changed, a new IP address of the UPnP device is acquired using the byebye message and information regarding the UPnP device is updated using the new IP address, thereby effectively managing the information regarding the UPnP device without removing the information.

Accordingly, the UPnP device can maintain an existing IP address-based service continuously and without user intervention even if the IP address changes, , since the period of time that a session is discontinued due to a change in the IP address of the UPnP device can be minimized and the information regarding the UPnP device stored in a control point can be effectively managed without being removed. If the existing IP address-based content streaming session is discontinued due to a change in the IP address of the UPnP device, such as a media server or a media renderer, the user can receive a seamless content streaming service regardless of the change in the IP address of the UPnP device.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of managing connection information regarding a device, comprising:
   establishing a first address-based network connection of the device using a first Internet Protocol (IP) address;
   changing an IP address of the device from the first IP address to a second IP address;
   transmitting a message indicating an end of the first address-based network connection using the first address, the message including the second IP address; and
   updating the connection information regarding the device to indicate that the IP address of the device is the second IP address.

2. The method of claim 1, wherein the message is a Universal Plug and Play (UPnP) byebye message, and
   wherein the message includes motive information that indicates a reason for transmitting the byebye message.

3. The method of claim 2, wherein the updating comprises:
   obtaining of the second IP address of the device from a predetermined field of the message.

4. The method of claim 2, wherein the updating comprises:
   determining whether the motive information indicates whether the reason for transmitting the byebye message is changing the IP address of the device from the first IP address to the second IP address; and
   if it is determined that the reason for transmitting the byebye message is changing the IP address of the device from the first IP address to the second IP address, updating the connection information at a control point without deleting the connection information at the control point.

5. The method of claim 1, further comprising:
   establishing a second address-based network connection of the device using the second IP address; and
   controlling the device through the second address-based network connection.

6. The method of claim 5, further comprising receiving an event message containing information regarding an event of the device through the second address-based network connection.

7. An apparatus for managing connection information regarding a device, comprising:
   an address obtaining unit that obtains a second Internet Protocol (IP) address of the device from a message indicating an end of a first address-based network connection of the device using a first IP address of the device; and
   an update unit that updates the connection information regarding the device to indicate that the IP address of the device is changed from the first IP address to the second IP address by using the second IP address obtained by the address obtaining unit.

8. The apparatus of claim 7, wherein the message is a Universal Plug and Play (UPnP) byebye message, and
   wherein the message includes motive information that indicates a reason for transmitting the byebye message.

9. A Non-transitory computer readable medium having embodied thereon a program for a method of managing connection information regarding a device, the method comprising:
   establishing a first address-based network connection of the device using a first Internet Protocol (IP) address;
   changing an IP address of the device from the first IP address to a second IP address;
   transmitting a message indicating an end of the first address-based network connection using the a first address, the message including the second IP address; and
   updating the connection information regarding the device to indicate that the IP address of the device is the second IP address.

10. A method of providing an Internet Protocol (IP) address of a device, comprising:
    determining whether the IP address of the device is changed from a first IP address to a second IP address; and
    if it is determined that the IP address of the device is changed from the first IP address to the second IP address, transmitting a message indicating an end of a first address-based network connection of the device using the first IP address, the message including the second IP address.

11. The method of claim 10, wherein the message is a Universal Plug and Play (UPnP) byebye message, and
    wherein the message includes motive information that indicates a reason for transmitting the byebye message.

12. The method of claim 10, wherein the message is provided to a control point which controls the device according to a UPnP standard.

13. The method of claim 10, wherein the message is a Universal Plug and Play (UPnP) byebye message, and
    wherein the second address is provided in the byebye message by adding a field recording the second address into the byebye message.

14. The method of claim 10, further comprising: storing the IP address of the device in a control point that controls the device according to a UPnP standard; and
    instructing the control point not to delete connection information of the device, including the IP address of the device, from the control point by adding a field that indicates a reason for transmitting the message is an IP address change of the device, and
    wherein the message is a UPnP byebye message.

15. An apparatus for providing an Internet Protocol (IP) address of a device, comprising:
    a detector that determines whether the IP address of the device is changed from a first IP address to a second IP address; and
    a providing unit that transmits a message indicating an end of a first address-based network connection of the device using the first IP address, the message including the second IP address, if the detector determines that the IP address of the device is changed from the first IP address to the second IP address.

16. The apparatus of claim 15, wherein the message is a Universal Plug and Play (UPnP) byebye message, and
    wherein the message includes motive information that indicates a reason for transmitting the byebye message.

17. A Non-transitory computer readable medium having embodied thereon a program for a method of providing an Internet Protocol (IP) address of a device, the method comprising:
    determining whether the IP address of the device is changed from a IP first address to a second IP address; and
    if it is determined that the IP address of the device is changed from the first IP address to the second IP address, transmitting a message indicating an end of a first address-based network connection of the device using the first IP address, the message including the second IP address.

18. A Non-transitory computer readable medium having embodied thereon a program that causes a computer to function as a Universal Plug and Play (UPnP) device that transmits a UPnP byebye message containing information regarding a change of an Internet Protocol (IP) address of the UPnP device from a first IP address to a second IP address, the byebye message comprising:

a first IP address field having the first IP address of the UPnP device;

a motive field that indicates a reason for transmission of the byebye message is the change of IP address of the UPnP device; and a second IP address field having the second IP address of the UPnP device.

* * * * *